(12) United States Patent
Yeh

(10) Patent No.: US 6,827,365 B2
(45) Date of Patent: Dec. 7, 2004

(54) SINGLE-HANDED REMOTE CONTROLLER (75) Inventor: Chuan-Ming Yeh, Chia-I Hsien (TW)

(73) Assignee: Link Treasure Limited, Tortola (VG)

(*) Notice: Subject to any disclaimer, the term of this patent is extended or adjusted under 35 U.S.C. 154(b) by 18 days.

(21) Appl. No.: 10/270,557

(22) Filed: Oct. 16, 2002

(65) Prior Publication Data
US 2003/0071441 A1 Apr. 17, 2003

(30) Foreign Application Priority Data
Oct. 16, 2001 (TW) ........................... 90217578 U (51) Int. Cl.⁷ .............................. B62B 1/00; B62B 7/00; B62B 9/00; A45C 13/00; F16H 21/40
(52) U.S. Cl. .................... 280/642; 280/47.38; 280/657; 190/115; 74/501.6; 74/506
(58) Field of Search ................................. 280/642, 643, 280/644, 647, 649, 650, 657, 658, 42, 655.1, 47.38, 47.4; 297/42, 44, 356, 376, 377, 408, DIG. 4; 190/118, 115, 117; 74/501.6, 502, 506, 551.3, 526, 108

(56) References Cited

U.S. PATENT DOCUMENTS

| 5,205,579 A | * | 4/1993 | Kato et al. .................. 280/642 |
| 5,524,503 A | * | 6/1996 | Ishikura ..................... 74/501.6 |
| 5,535,483 A | * | 7/1996 | Jane Cabagnero ........... 16/429 |
| 6,068,284 A | * | 5/2000 | Kakuda ...................... 280/642 |
| 6,422,587 B1 | * | 7/2002 | Yamazaki et al. .......... 280/647 |
| 6,561,536 B2 | * | 5/2003 | Suzuki ....................... 280/642 |
| 6,705,179 B1 | * | 3/2004 | Mohtasham ................. 74/505 |
| 6,752,413 B2 | * | 6/2004 | Yamazaki et al. .......... 280/647 |
| 2003/0075902 A1 | * | 4/2003 | Hsia ........................... 280/647 |

FOREIGN PATENT DOCUMENTS

DE 198 33 857 A 9/2002

* cited by examiner

Primary Examiner—Christopher P. Ellis
Assistant Examiner—G B Klebe
(74) Attorney, Agent, or Firm—Birch, Stewart, Kolasch & Birch, LLP (57) ABSTRACT A single-handed remote controller is disclosed. Such a controller is installed at the handle of an accordion frame and is connected to a lock mechanism of the frame through a flexible element. As the remote controller rotates relative to the handle, the flexible element is coiled around the handle, changing the relative position between the lock mechanism and the handle. The frame is thus changed to make the folding much easier.

8 Claims, 8 Drawing Sheets

SINGLE-HANDED REMOTE CONTROLLER

BACKGROUND OF THE INVENTION

1. Field of Invention

The invention relates to a single-handed remote controller, which is designed for an accordion frame to make the folding easier.

2. Related Art

The baby stroller is a moving carrier designed exclusively for babies and small children. The accordion stroller is especially convenient for carrying and storage because its volume can be minimized.

Figure 1:
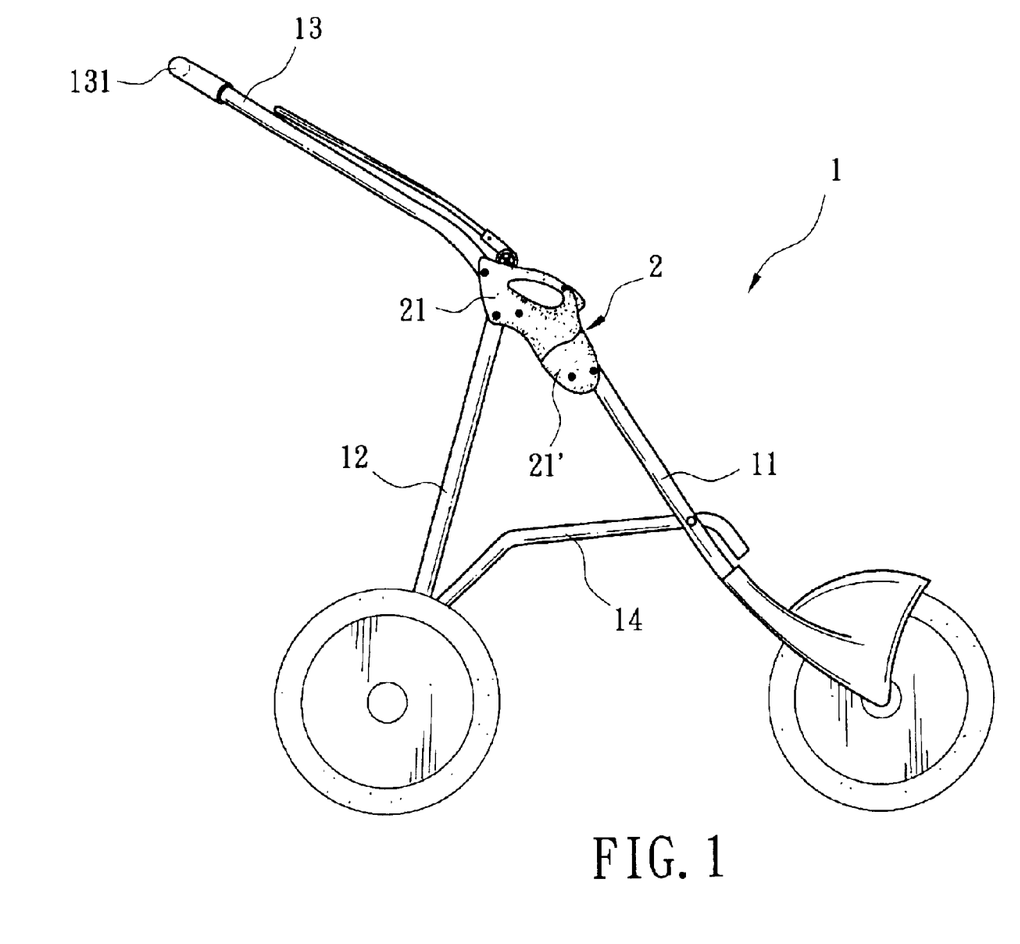
FIG. 1 shows the configuration of the stroller frame and the lock mechanism.

Conventional accordion strollers have various kinds of styles. When not in use, the stroller frame can be folded to minimize its volume during transportation or storage. As shown in FIG. 1, the frame 1 is comprised of front and rear wheel pipes 11, 12 with wheels installed at the bottom ends, a handle pipe 13 for the user to push and pull, and a chair frame pipe 14. These components are connected through a lock mechanism 2. After the frame 1 is unfolded, the lock mechanism 2 fixes the relative positions of them to form a stroller that can carry babies.

As described before, the conventional lock mechanism is installed at the joint place of the components, that is, about half height on both sides of the stroller. Consequently, normal adults have to bend down in order to disable the lock mechanism, and use both hands to operate the lock mechanism on both sides of the frame. From the operational point of view, the user's height is usually higher than the lock mechanism. Therefore, the user has to lower his/her body and even reach both hands behind the lock mechanism in order to operate the lock mechanism.

In view of the operational inconvenience, the Deutsche Pat. No. DE 198 33857 A 1 disclosed an improved structure of the lock mechanism. It is a special and practical design. The handle pipe is mounted with an element connecting to the lock mechanism. Therefore, the user only needs to control this element at the handle pipe, and the lock mechanism will react accordingly to remove the restriction on the frame. Nevertheless, this design has a very complicated structure. The user has to impose a large force to separate the front wheel pipe from the handle pipe. For users with less strength, the operation may be difficult and inconvenient.

SUMMARY OF THE INVENTION

To solve the above-mentioned problems, the invention provides a single-handed remote controller, so that the folding process of an accordion frame becomes simpler and easier.

The disclosed single-handed remote controller is installed at the handle of an accordion frame and is connected with a lock mechanism of the frame through a flexible element. As the remote controller rotates relative to the handle, the flexible element is coiled around the handle, changing the relative position between the lock mechanism and the handle. The frame is thus changed to make the folding much easier.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

FIG. 1 shows a lock mechanism 2 designed for the accordion frame 1 of a stroller. The stroller frame 1 consists of several pipes connected with joints. Such pipes include front and rear wheel pipes 11, 12 that are installed with wheels at the bottom ends, a handle pipe 13 and chair pipes 14. One side of the frame 1 is mounted with a lock mechanism 2 that is comprised of two covers 21, 21'. The covers 21, 21' are connected to the front and rear wheel pipes 11, 12 and the handle pipe 13. It is normally in the lock position (see FIG. 2A) because of the lock axis 22 that limit the rotational motion of the covers 21, 21'. Therefore, the front and rear wheel pipes 11, 12 are locked in the extended state of the frame 1. The lock axis 22 can be displaced to a release position that allows the covers 21, 21' to rotate (FIG. 2B). In this case, the front and rear wheel pipes 11, 12 and the handle pipe 13 can be rotated so that the frame 1 is folded up.

As shown in FIGS. 1, 3A, 3B, 4, 5A, and 5B, the handle 131 in the middle section of the handle pipe 13 is installed with a single-handed remote controller 3 that contains a rotator 31, a flexible element 32, and a cover 33.

Figure 2A:
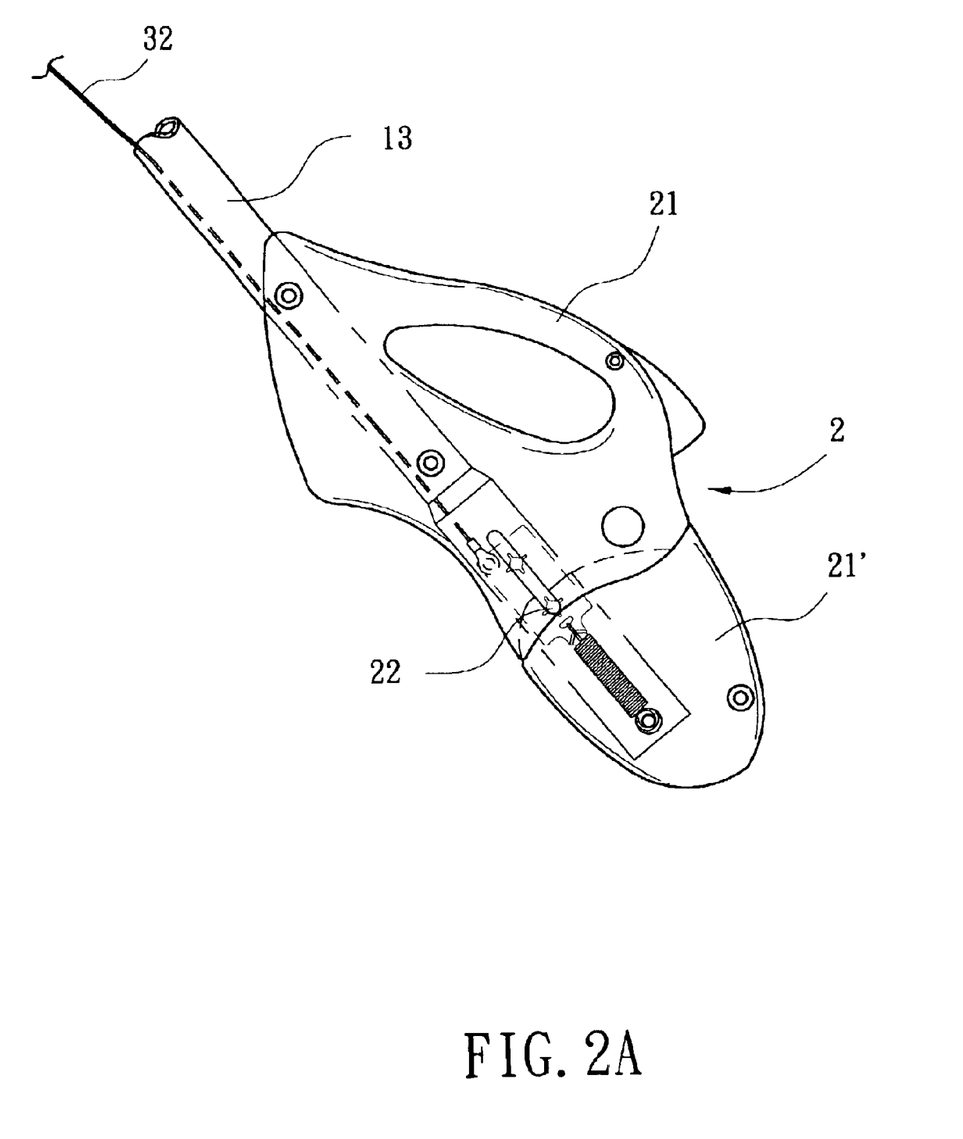
FIGS. 2A and 2B are schematic views of the lock mechanism relative to the stroller frame in its extended and folded states.
Figure 2B:
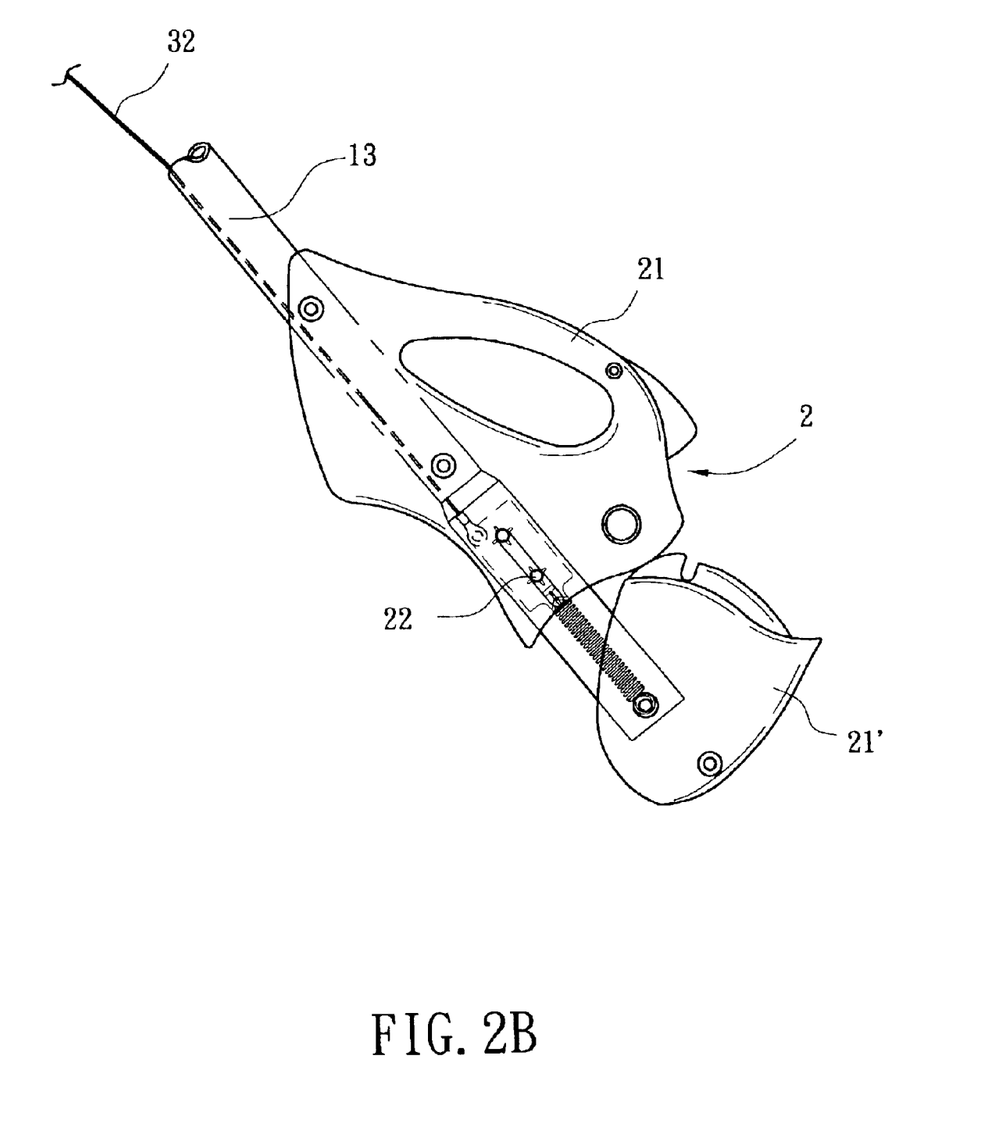

The rotator 31 is installed on the handle 131 (FIG. 3B), connecting to the lock mechanism 2 through the flexible element 32 that goes through the through hole 1311 of the handle 131 (see FIGS. 2A and 2B). The rotator further has an engagement groove 311.

Figure 3A:
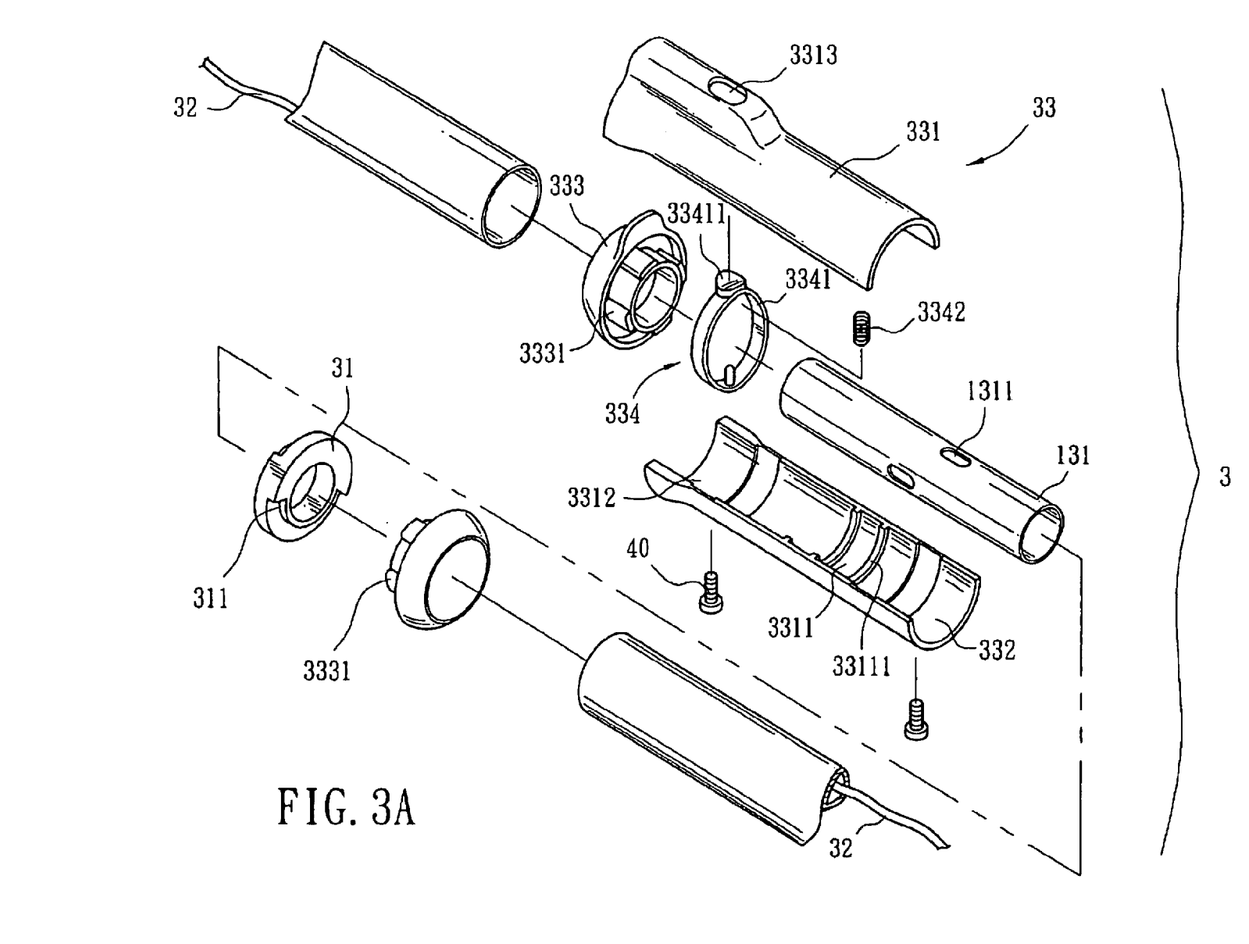
FIGS. 3A and 3B are exploded and combinatorial view of the invention.
Figure 3B:
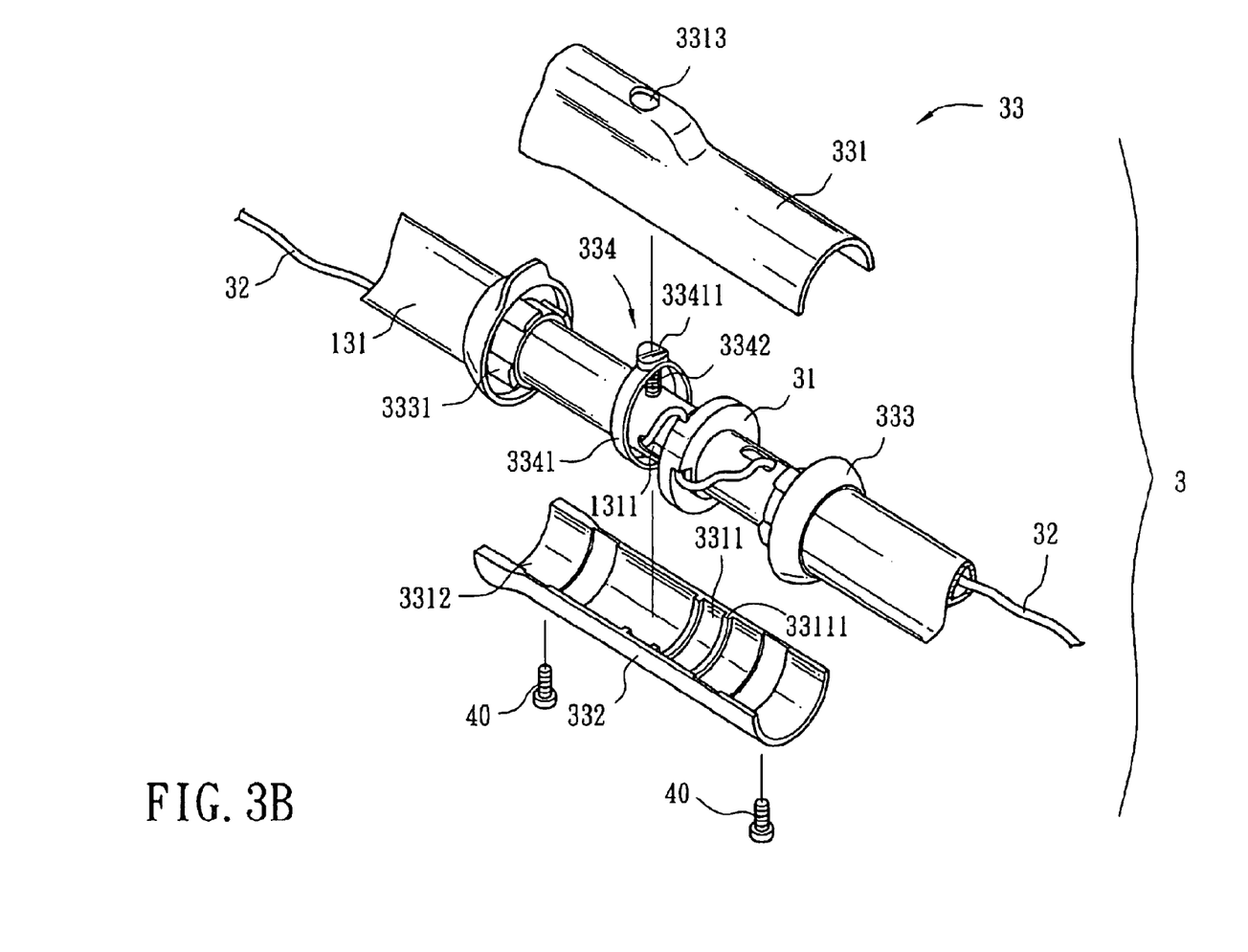
Figure 5A:
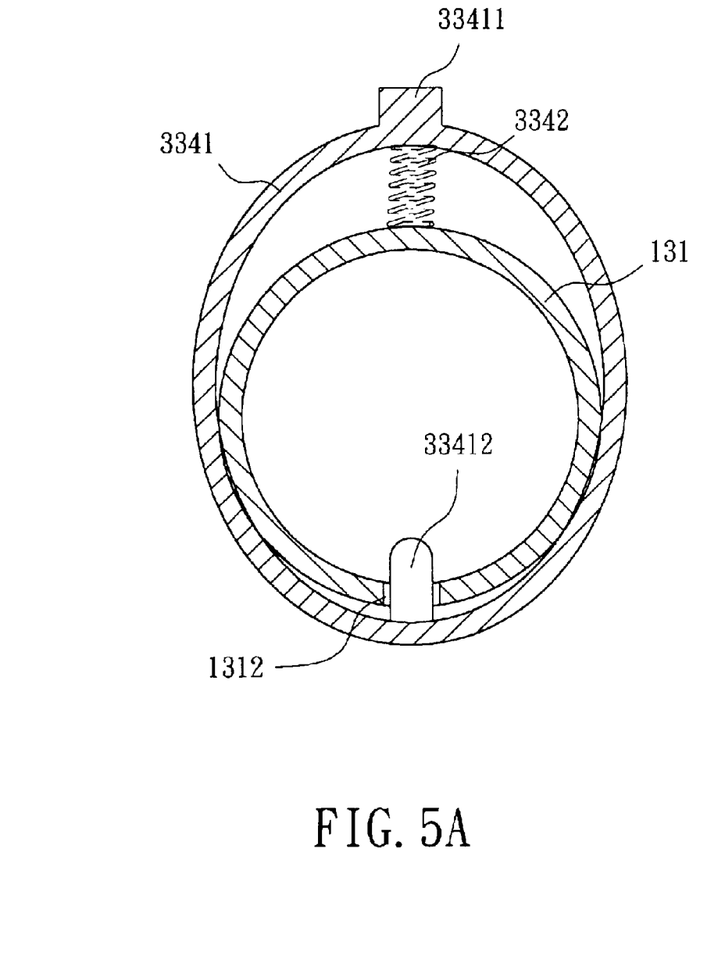
FIGS. 5A and 5B are schematic views of the snap mechanism when the cover is in its fixed and mobile positions, respectively.
Figure 5B:
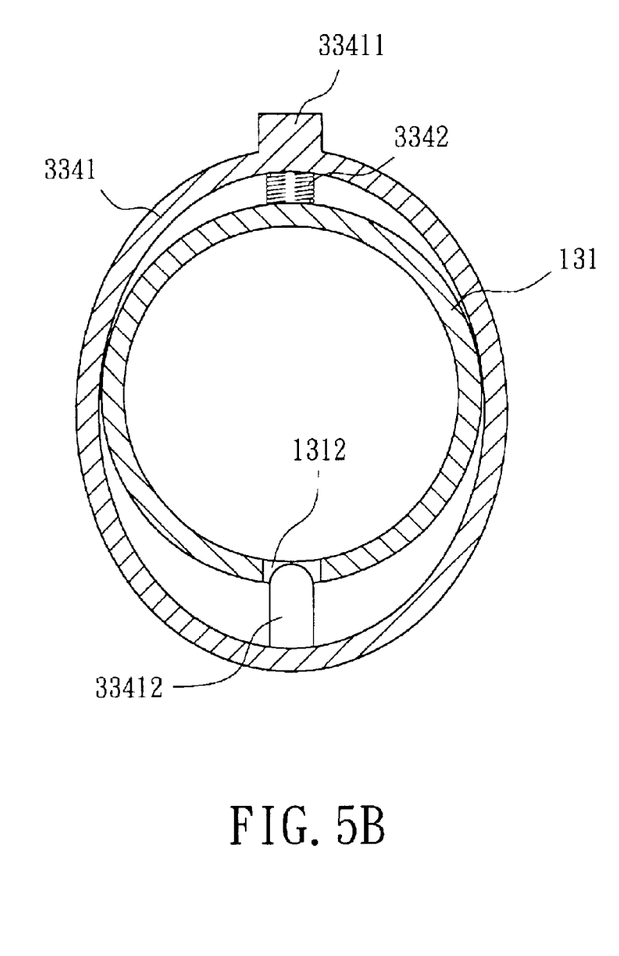

The cover 33 is mounted at the handle 131. It contains a first outer cover 331, a second outer cover 332, a connector 333, and a snap mechanism 334. The first outer cover 331 has an opening 3313. Both the first outer cover 331 and the second outer cover 332 have an engagement groove 3311 and an engagement area 3312. The two sides of the engagement groove 3311 are side-walls 3311' that engage with the engagement groove 311 of the rotator 31. The connector 333 is installed at the handle 131 (FIG. 3) with an engagement area 3331. The first outer cover 331, the second outer cover 332, and the connector 333 are then connected through their engagement areas 3312, 3331. The first outer cover 331 and the second outer cover 332 are combined with the rotator 31 through their engagement grooves 3311, 311, and then fastened by a screw (or rivet) 40, as shown in FIG. 3. The snap mechanism 334 limits the cover 33 to its fixed position or mobile position (FIGS. 5A and 5B). The snap mechanism 334 contains a lock ring 3341 mounted at the outer rim of the handle 131 and an elastic element 3342 sandwiched between the lock ring 3341 and the handle 131. The lock ring further contains a pressure-bearing block 33411 and a post 33412 protruding from its surface.

Figure 4:
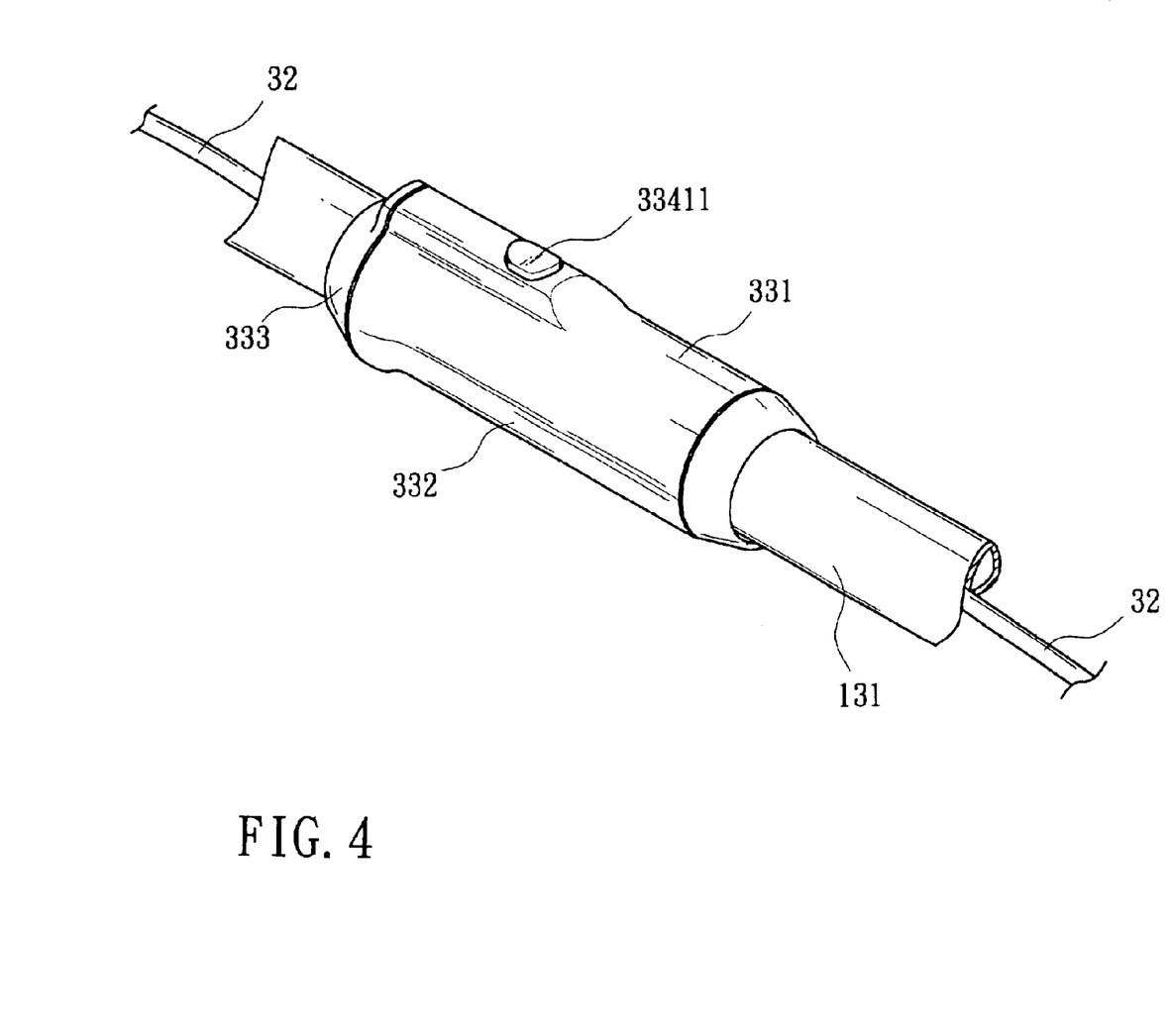
FIG. 4 is a schematic view of the fixed position of the cover in the invention.
Figure 6:
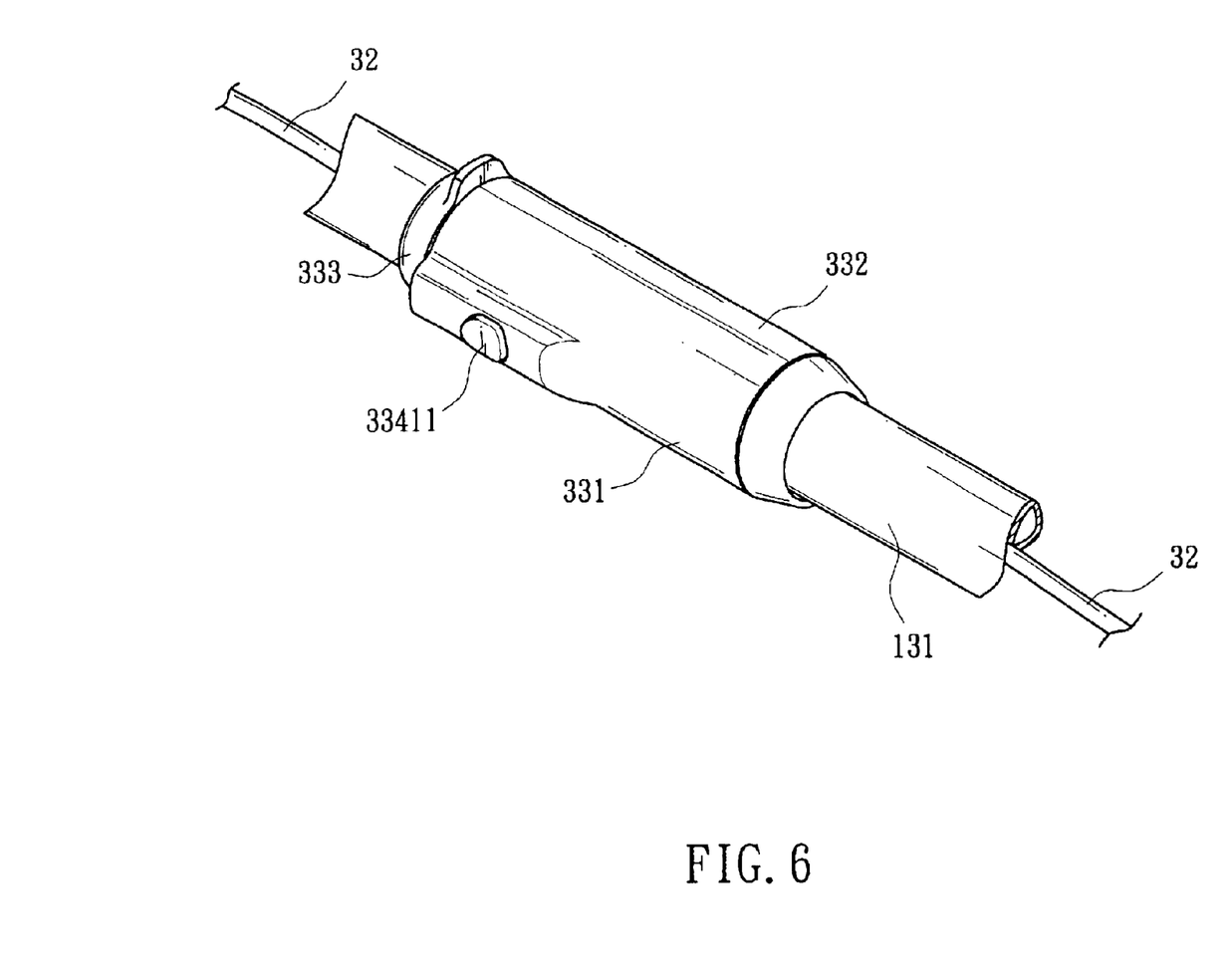
FIG. 6 is a schematic view of the mobile position of the disclosed cover.

When the cover 33 is in its fixed position, the lock ring 3341 is raised by the elastic element 3342 in its normal state. The pressure-bearing block 33411 pushes against the opening 3313 of the first outer cover 331 and the post 33412 sticks into the hole 1312 of the handle 131, so that the cover 33 cannot rotate relative to the handle 131 (FIGS. 4 and 5). On the other hand, when the cover 33 is in its mobile position, the elastic element 3342 is depressed by a pressure. Therefore, the lock ring 3341 is displaced downwards. The post 33412 then leaves the hole 1312 s0 that the cover 33 may rotate with the rotator 31 relative to the handle 131 by the engagement groove 311 and 3311. The flexible element 32 changes the relative positions of the lock mechanism 2 and the rotator 31. This is achieved by coiling the flexible element 32 around the handle 131. The frame 1 state is hence changed (FIGS. 5B and 6).

Effects of the Invention

The disclosed single-handed remote controller enables the user to directly change the frame state as he or she stands upright. By pressing a pressure-bearing block using a single hand, the cover can rotate relative to the handle. Therefore, the frame state can be changed by using one hand.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A single-handed remote controller applied to a handle on a frame that has a folded state and an extended state and a lock mechanism for locking its extended state, the single-handed remote controller comprising:

a cover, which is installed on the handle to rotate relative to the handle and has a snap mechanism to constrain the cover in a fixed position and a mobile position; and a rotator, which is installed on the handle and connected to the lock mechanism through a flexible element, and rotates with the cover relative to the handle when the cover is in its mobile state so that the flexible element changes the relative positions of the lock mechanism and the rotator by coiling around, which in turn changes the state of the frame, the flexible element changes the relative positions of the lock mechanism and the rotator by coiling around the handle as the cover rotates with the rotator, which in turn changes the state of the frame.

2. The single-handed remote controller of claim 1, wherein the cover comprises a first outer cover, a second outer cover combined with the first outer cover, and two connectors connected to the two ends of the first outer cover and the second outer cover.

3. The single-handed remote controller of claim 2, wherein the first outer cover and the second outer cover are fixed and connected through a screw.

4. The single-handed remote controller of claim 2, wherein the first outer cover and the second outer cover are fixed and connected through a rivet.

5. The single-handed remote controller of claim 2, wherein the outer covers and the connectors have an engagement area for their combination.

6. The single-handed remote controller of claim 1, wherein the snap mechanism comprises a lock ring mounted on the outer rim of the handle and an elastic element sandwiched between the lock ring and the handle, the lock ring being further installed with a post that is constantly pushed by the elastic element against the hole on the handle and leaves the hole when the elastic element is depressed.

7. The single-handed remote controller of claim 6, wherein the lock ring is formed with a pressure-bearing block protruding from its surface.

8. The single-handed remote controller of claim 1, wherein the cover and the rotator have an engagement groove for their combination.

* * * * *